United States Patent
Hatakeyama et al.

(10) Patent No.: US 9,222,636 B2
(45) Date of Patent: Dec. 29, 2015

(54) VEHICLE INFORMATION TRANSMISSION DEVICE

(75) Inventors: Yoshiyuki Hatakeyama, Fuji (JP); Shinya Kawamata, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 13/990,567

(22) PCT Filed: Dec. 5, 2011

(86) PCT No.: PCT/IB2011/002918
§ 371 (c)(1),
(2), (4) Date: May 30, 2013

(87) PCT Pub. No.: WO2012/076952
PCT Pub. Date: Jun. 14, 2012

(65) Prior Publication Data
US 2013/0249395 A1 Sep. 26, 2013

(30) Foreign Application Priority Data
Dec. 8, 2010 (JP) .................................. 2010-273884

(51) Int. Cl.
*B60Q 1/14* (2006.01)
*F21S 8/10* (2006.01)
*B60K 35/00* (2006.01)
*B60R 1/00* (2006.01)

(52) U.S. Cl.
CPC ................. *F21S 48/00* (2013.01); *B60K 35/00* (2013.01); *B60R 1/00* (2013.01)

(58) Field of Classification Search
CPC ... H04W 76/023; H04W 4/008; H04W 12/06; B60R 1/00; B60R 1/06; B60R 2001/1253; B60R 2300/607
USPC .......................................... 315/77, 78, 79, 80
See application file for complete search history.

(56) References Cited

U.S. PATENT DOCUMENTS

| 7,379,813 B2 | 5/2008 | Kubota et al. |
| 2005/0154505 A1 | 7/2005 | Nakamura et al. |
| 2008/0186156 A1* | 8/2008 | Uematsu et al. ............... 340/441 |
| 2009/0231116 A1 | 9/2009 | Takahashi et al. |
| 2010/0253539 A1 | 10/2010 | Seder et al. |

FOREIGN PATENT DOCUMENTS

| CN | 101876751 A | 11/2010 |
| DE | 10 2004 060 380 A1 | 7/2005 |
| EP | 1 632 923 A2 | 3/2006 |
| JP | A-2000-172994 | 6/2000 |
| JP | A-2001-171390 | 6/2001 |
| JP | A-2002-274216 | 9/2002 |
| JP | A-2003-54334 | 2/2003 |

(Continued)

*Primary Examiner* — John Poos
(74) *Attorney, Agent, or Firm* — Oliff PLC

(57) ABSTRACT

A vehicle information transmission device includes: a display device that displays light in a first mode at a position of a vehicle body, at which visual recognition of a certain object is prompted, when the visual recognition is prompted and that displays light in a second mode different from the first mode on the vehicle body when the visual recognition is not prompted or when the visual recognition is prompted; and a control unit that adjusts light in the second mode on the basis of light in the first mode when the visual recognition is prompted.

11 Claims, 15 Drawing Sheets

(56) References Cited

FOREIGN PATENT DOCUMENTS

| JP | A-2004-155307 | 6/2004 |
| JP | B2-3626229 | 3/2005 |
| JP | A-2008-189201 | 8/2008 |
| JP | A-2009-217682 | 9/2009 |
| JP | A-2010-120501 | 6/2010 |
| JP | A-2010-176591 | 8/2010 |
| JP | A-2012-123628 | 6/2012 |
| JP | A-2012-123629 | 6/2012 |
| JP | A-2012-126251 | 7/2012 |
| JP | A-2012-126252 | 7/2012 |
| WO | WO 2012/076954 A2 | 6/2012 |
| WO | WO 2012/076955 A2 | 6/2012 |
| WO | WO 2012/077202 A1 | 6/2012 |
| WO | WO 2012/077367 A1 | 6/2012 |
| WO | WO 2012/080804 A2 | 6/2012 |
| WO | WO 2012/080806 A2 | 6/2012 |

* cited by examiner

| L | COLOR | LUMINANCE |
|---|---|---|
| NEAR | DEEP | DARK |
| INTER-MEDIATE | REFERENCE VALUE | REFERENCE VALUE |
| FAR | LIGHT | BRIGHT |

| θ | COLOR | LUMINANCE |
|---|---|---|
| LARGE | DEEP | DARK |
| INTER-MEDIATE | REFERENCE VALUE | REFERENCE VALUE |
| SMALL | LIGHT | BRIGHT |

| BODY COLOR | NORMAL COLOR | REMINDING COLOR | WARNING COLOR | LUMINANCE |
|---|---|---|---|---|
| WHITE SERIES | GREEN | ORANGE | RED | HIGH LUMINANCE |
| BLACK SERIES | GREEN | ORANGE | RED | LOW LUMINANCE |
| RED SERIES | LIGHT BLUE | GREEN | YELLOW | INTERMEDIATE LUMINANCE |
| BLUE SERIES | GREEN | YELLOW | RED | INTERMEDIATE LUMINANCE |
| YELLOW SERIES | BLUE | PINK | RED | INTERMEDIATE LUMINANCE |

F I G . 15
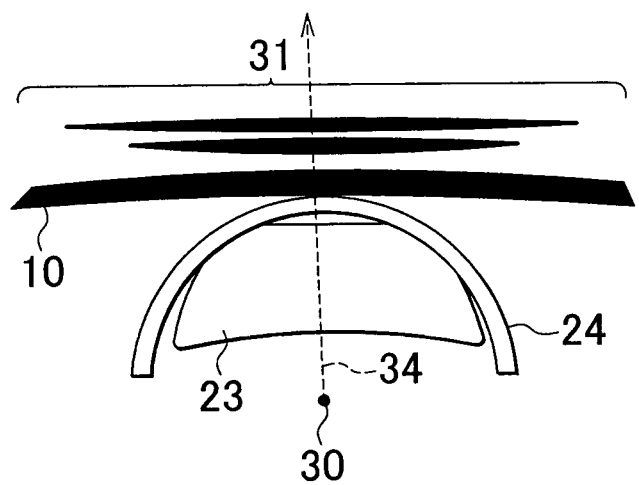
F I G . 16
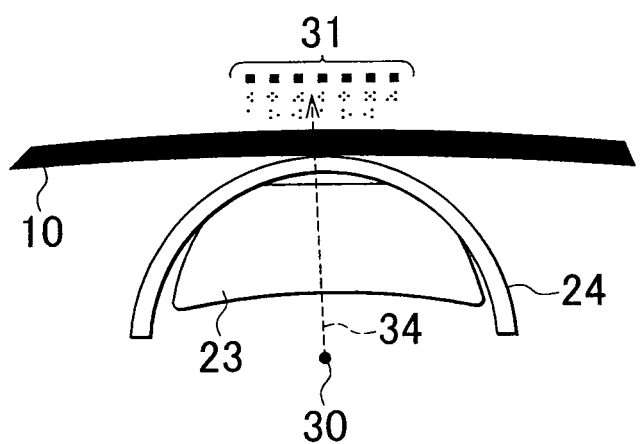

```
START
  ↓
MEASURE EXTERNAL ENVIRONMENT — SA1
  ↓
RECOGNIZE EXTERNAL ENVIRONMENT — SA2
  ↓
COMPUTE DEGREE OF RISK — SA3
  ↓
SET PHOTOSTIMULATION PATTERN — SA4
  ↓
PHOTOSTIMULATED DISPLAY — SA5
  ↓
END
```

VEHICLE INFORMATION TRANSMISSION DEVICE

BACKGROUND OF THE INVENTION

1. Field of the Invention

The invention relates to a vehicle information transmission device.

2. Description of Related Art

Japanese Patent Application Publication No. 2010-176591 (JP-A-2010-176591) describes a vehicle display device that causes a front windshield to reflect light from LEDs to transmit information to a driver. Japanese Patent No. 3626229 describes a vehicle drive support system that projects light from light sources installed in a vehicle so that light is reflected at a position on the surface of a front windshield, which corresponds to a detected position of a risk outside the vehicle, to inform a driver of the risk.

Note that Japanese Patent Application Publication No. 2001-171390 (JP-A-2001-171390), Japanese Patent Application Publication No. 2004-155307 (JP-A-2004-155307) and Japanese Patent Application Publication No. 2000-172994 (JP-A-2000-172994) are listed as other related art documents. JP-A-2001-171390 describes a vehicle head-up display that displays the condition of radio waves even when a message is not received, in order to moderately make a driver aware of a displayed incoming message when the message is displayed. JP-A-2004-155307 describes a vehicle display device that displays an image shifted in a curve direction during cornering. JP-A-2000-172994 describes a vehicle obstacle warning device that, when an obstacle has been detected on the right side or left side of the vehicle, individually changes the sizes or luminances of right and left warning displays.

However, the techniques described in JP-A-2010-176591 and Japanese 3626229 still have room for improvement in terms of the way of information transmission.

SUMMARY OF THE INVENTION

The invention provides a vehicle information transmission device that carries out information transmission in a manner such that driver's feeling of strangeness is reduced.

A first aspect of the invention relates to a vehicle information transmission device. The vehicle information transmission device includes: a display device that displays light in a first mode at a position on a vehicle body, at which visual recognition of a certain object is prompted, when the visual recognition is prompted and that displays light in a second mode different from the first mode on the vehicle body when the visual recognition is not prompted and when the visual recognition is prompted; and a control unit that adjusts light in the second mode on the basis of light in the first mode when the visual recognition is prompted. Note that, in the above aspect, when the visual recognition is prompted, the control unit may adjust only a portion, which corresponds to the position at which the visual recognition is prompted, of light in the second mode displayed on the vehicle body. In addition, the display device may display light at a plurality of different positions on the vehicle body when the visual recognition is prompted and when the visual recognition is not prompted. In addition, the display device may display red series light and green series light on the vehicle body when the visual recognition is prompted, and may display the green series light on the vehicle body when the visual recognition is not prompted. In addition, the display device may display light on the vehicle body in a manner such that a series of light dots extends in a vehicle-width direction. In addition, the control unit may correct a center position of light on the basis of a curved shape of a road when light is displayed on the vehicle body.

According to the above aspect of the invention, light in the first mode is displayed at the position on the vehicle body, at which visual recognition of the certain object is prompted, when the visual recognition is prompted, and light in the second mode different from the first mode is displayed on the vehicle body when the visual recognition is not prompted and when the visual recognition is prompted. Thus, when the state of the vehicle information transmission device changes from the state where visual recognition is not prompted to the state where the visual recognition is prompted, light in the second mode is adjusted on the basis of light in the first mode, so it is possible to carry out information transmission in a manner such that driver's feeling of strangeness is reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 15 is a view that shows an example of the way of showing a virtual image;

FIG. 16 is a view that shows an example of the way of showing a virtual image;

DETAILED DESCRIPTION OF EMBODIMENTS

Figure 1:
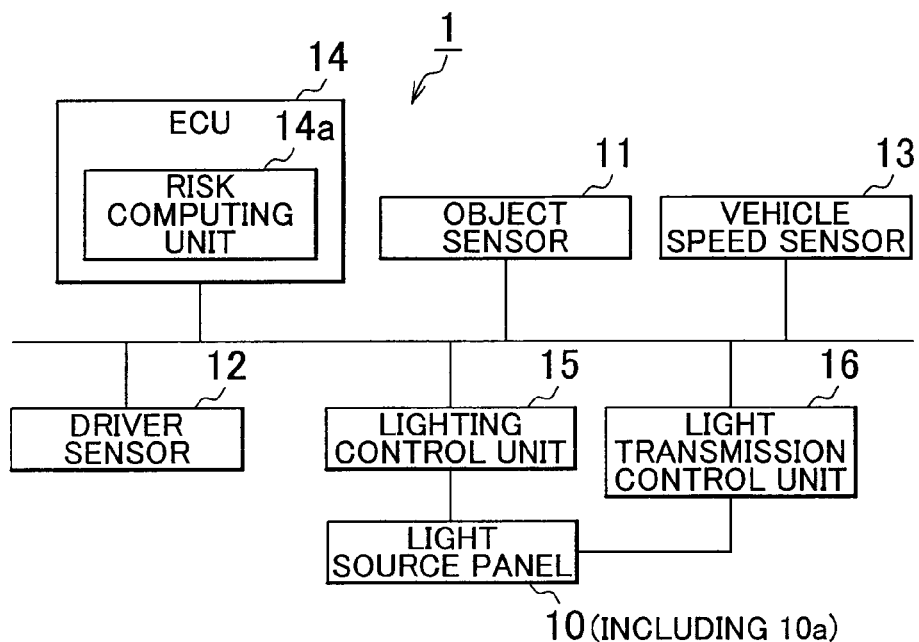
FIG. 1 is a block diagram that shows an example of the configuration of a vehicle information transmission system according to an embodiment.

Hereinafter, a vehicle information transmission system that includes a vehicle information transmission device according to an embodiment of the invention will be described in detail with reference to the accompanying drawings. Note that the aspect of the invention is not limited by this embodiment.

The vehicle information transmission system according to the present embodiment projects light from a plurality of light sources (light-emitting diodes (LEDs)) mounted (arranged) in an array (a plurality of rows or a plurality of columns) at an instrument panel, onto a front windshield to notify (remind or warn) a driver of a position at which a risk object (such as a pedestrian, a bicycle, an automobile and a blind spot) around a host vehicle is present or a direction in which the risk object is present with a virtual image made from the projected light. Hereinafter, an example of the configuration of this system, an example of the operation executed by this system, and the like, will be described in detail with reference to the accompanying drawings.

Note that, in the following description, a position at which the light sources are mounted is set at the instrument panel; instead, the position may be, for example, set at a meter panel, or the like. In addition, the light sources are single-color LEDs; instead, the light sources may be, for example, full-color LEDs, bulbs, or the like. In addition, a portion onto which light is projected (a portion on which a virtual image is displayed) is the front windshield; instead, the portion may be, for example, an A pillar, a sideview mirror, the meter panel, the instrument panel, or the like. In addition, details notified to the driver contain a risk object (risk); instead, the details may, for example, contain a route guidance, an arrival of an e-mail, the condition of the driver (such as waking and sleeping), the condition of the host vehicle (such as an eco-driving condition), or the like. In addition, a risk object is detected by an object sensor; instead, a risk object may be, for example, detected by image recognition using a camera, communication, such as inter-vehicle communication and road-to-vehicle communication, navigation information (such as a map and a database about risky places, or the like), or the like. In addition, the position and direction for which a notification is provided are left and right when viewed from the driver; instead, the position and direction may be, for example, front and rear, or the like. In addition, the shape of a displayed virtual image is a linear shape (dot sequence); instead, the shape may be, for example, a graphic such as an icon, a character, a symbol, or the like. In addition, other than a notification of a position at which a risk object is present or a direction in which a risk object is present, the details (such as information that the risk object is a pedestrian, a bicycle, an automobile or a blind spot), or the like, of the risk object may also be notified. In addition, the mode of notification (the form of notification and the way of notification) is light; instead, the mode of notification may be, for example, any human recognizable mode, such as sound (voice) and operation reaction force.

1. Configuration

FIG. 1 is a block diagram that shows an example of the configuration of the vehicle information transmission system according to the present embodiment. A vehicle 1 includes a light source panel 10, an object sensor 11, a driver sensor 12, a vehicle speed sensor 13, an electronic control unit (ECU) 14, a lighting control unit 15 and a light transmission control unit 16. The light source panel 10 has a plurality of light sources 10*a* and a mechanism that adjusts the degree of transmission of light and luminance of light from the light sources 10*a*. The ECU 14 includes a risk computing unit 14*a*. The light source panel 10 may be regarded as a display device according to the aspect of the invention.

The object sensor 11 detects an external environment (information about an object, such as a pedestrian, a bicycle, an automobile and a blind spot (such as a spot behind a building, the blind side of a curve and the blind side of a vehicle), a road shape, such as a straight road, a left-hand curve and a right-hand curve) around the vehicle 1. The driver sensor 12 detects driver's point of gaze and direction of gaze. The vehicle speed sensor 13 detects the speed of the vehicle 1. The risk computing unit 14*a* computes (estimates) the degree of risk around the vehicle 1 on the basis of the external environment around the vehicle 1 detected by the object sensor 11, the point of gaze and direction of gaze detected by the driver sensor 12, the vehicle speed detected by the vehicle speed sensor 13, and the like.

Figure 2:
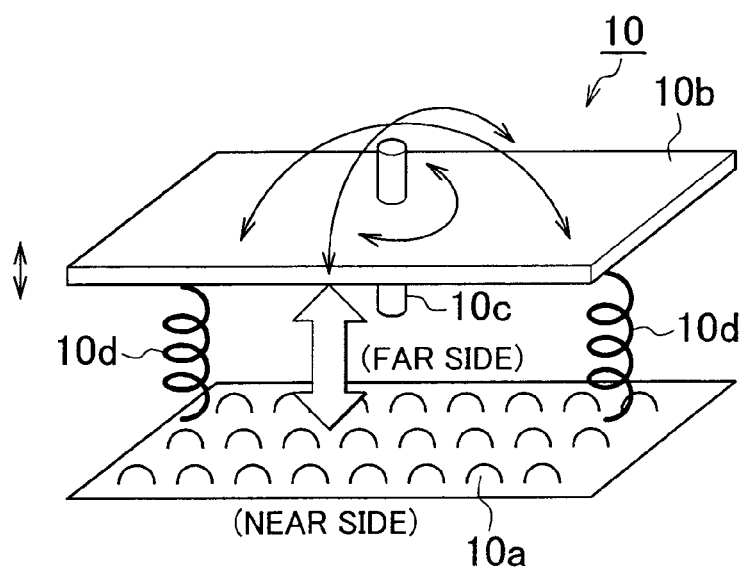
FIG. 2 is a view that shows an example of the configuration of a light source panel.

FIG. 2 is a view that shows an example of the configuration of the light source panel 10. As shown in FIG. 2, the light source panel 10 includes a diffuser panel 10*b*, a shaft member 10*c* and springs 10*d*. In the light source panel 10, the plurality of light sources 10*a* are arranged in an array of a plurality of rows or plurality of columns so that light may be emitted in a lateral direction (horizontal direction, vehicle-width direction) and a longitudinal direction (height direction, vertical direction). In order to project three red, yellow and green horizontal line virtual images on the front windshield from top, the light source panel 10 is installed so that the light sources 10*a* that emit red series light are arranged in a line near the driver, the light sources 10*a* that emit yellow series light are arranged in a middle line and then the light sources 10*a* that emit green series light are arranged in a far-side line. In the light source panel 10, the diffuser panel 10*b* and the shaft member 10*c* are used to entirely or partially adjust the degree of transmission of light (the degree of blur of light/the degree of diffusion of light) from the light sources 10*a* in association with the positions of the light sources 10*a*, and the plurality of springs 10d are used to keep the distance between the light sources 10a and the diffuser panel 10b maximal in the event of a failure. The plurality of springs 10d serve as a fail-safe device. An actuator (not shown) such as a motor is arranged in the light source panel 10. The actuator electromagnetically or electrically carries out three rotational movements (vertical, horizontal and twisting movements), that is, the pitch, yaw and roll, of the diffuser panel 10b. The diffuser panel 10b is, for example, formed of a thin plate member made of a material, such as polypropynene and polycarbonate. The shaft member 10c is a shaft member that serves as an axis of three rotational movements of the diffuser panel 10b. Note that the positions of the springs 10d or the number of the springs 10d may be set so as to be able to keep the distance between the light sources 10a and the diffuser panel 10b maximal in the event of a failure. In addition, in order to expand light to a wider range, Fresnel lens may be inserted above or below the diffuser panel 10b.

Figure 3:
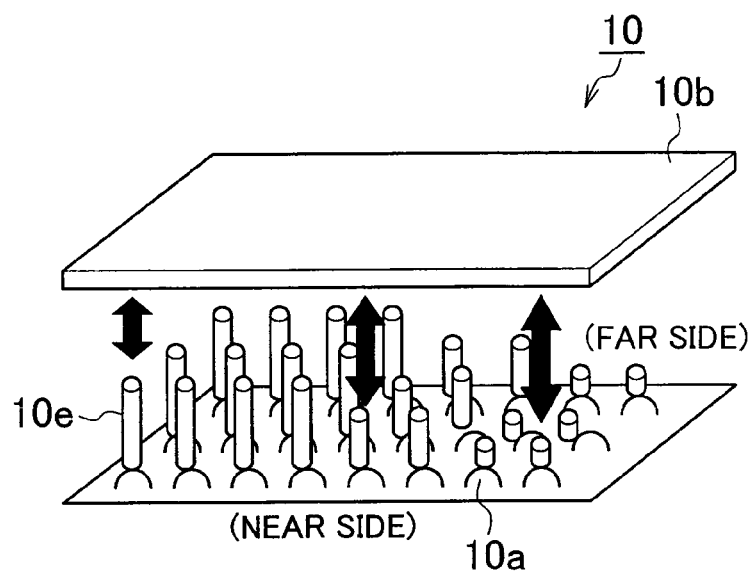
FIG. 3 is a view that shows an example of the configuration of a light source panel.

FIG. 3 is a view that shows another example of the configuration of the light source panel 10. As shown in FIG. 3, the light source panel 10 includes light guide members 10e. The diffuser panel 10b and the light guide members 10e are arranged in the light source panel 10. The diffuser panel 10b and the light guide members 10e are used to adjust the degree of transmission of light from the light sources 10a. The light guide members 10e are, for example, optical fibers, or the like, and are arranged individually in correspondence with the light sources 10a as shown in the drawing. An actuator (not shown) is arranged in the light source panel 10. The actuator adjusts the distance between the diffuser panel 10b and the light guide members 10e. With the configuration shown in FIG. 3, the degree of transmission of light from each of the light sources 10a may be adjusted independently of one another.

Figure 4:
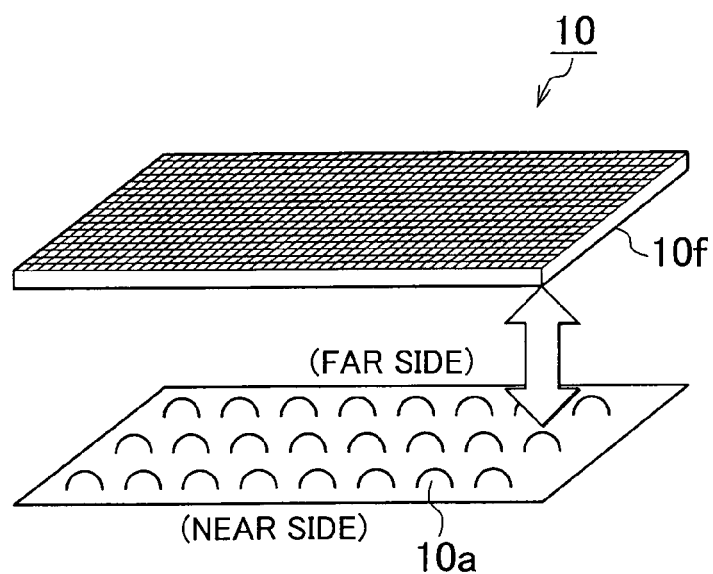
FIG. 4 is a view that shows an example of the configuration of a light source panel.

FIG. 4 is a view that shows another example of the configuration of the light source panel 10. As shown in FIG. 4, the light source panel 10 includes a liquid crystal panel 10f. The liquid crystal panel 10f is arranged in the light source panel 10 in a state where the distance from the light sources 10a are fixed. The liquid crystal panel 10f is used to adjust the degree of transmission of light from the light sources 10a. With the configuration shown in FIG. 4, the aperture ratio of the liquid crystal panel 10f is decreased from the center toward the periphery to make it possible to blur light.

Figure 5:
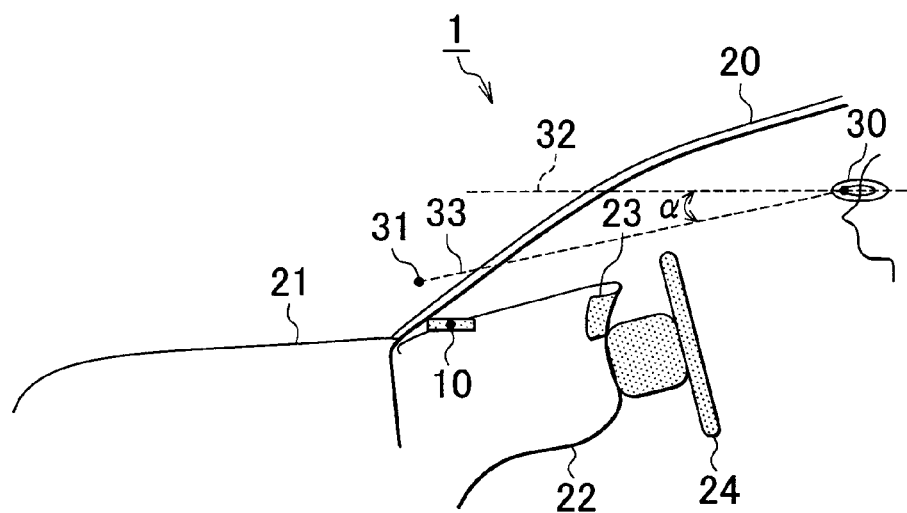
FIG. 5 is a view that shows an example of a position at which the light source panel is mounted.
Figure 6:
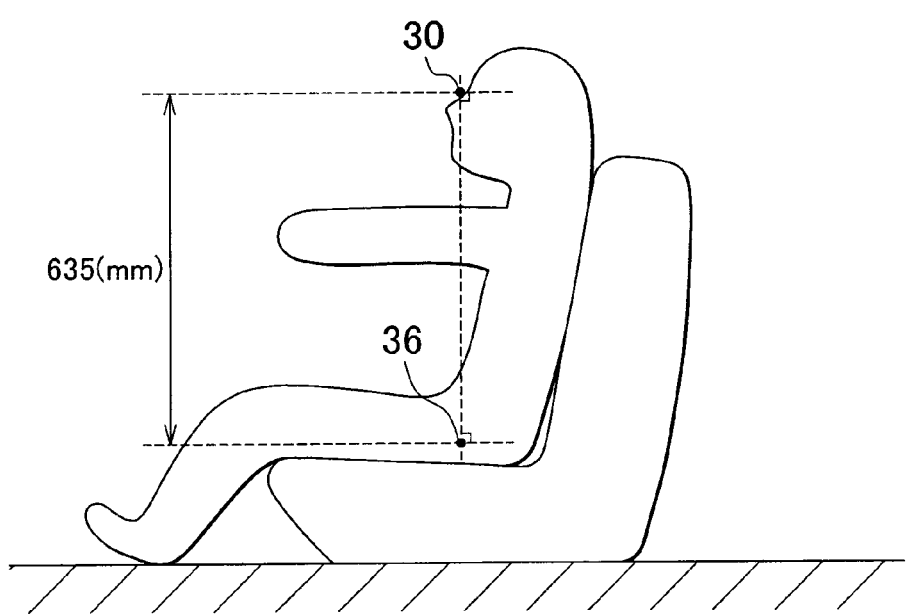
FIG. 6 is a view that shows an example of the definition of an eye point.

FIG. 5 is a view that shows an example of a position at which the light source panel 10 is mounted in the vehicle 1. As shown in FIG. 5, the reference numeral 20 denotes a front windshield that has a ghost reduction structure, such as a tapered glass, the reference numeral 21 denotes a hood, the reference numeral 22 denotes an instrument panel, the reference numeral 23 denotes a meter panel, the reference numeral 24 denotes a steering wheel, the reference numeral 30 denotes a driver's eye point, the reference numeral 31 denotes a virtual image formed by light from the light source panel 10, the reference numeral 32 denotes a horizontal line that passes through the eye point 30, and the reference numeral 33 denotes the optical path of light from the light source panel 10. The light source panel 10 is installed on the instrument panel 22, and is specifically installed at a position such that the virtual image 31 may be recognized by the driver in the lowermost region (for example, the depression angle α from the horizontal line 32 that passes through the eye point 30 is smaller than or equal to five degrees) of a peripheral visual field of the driver. For example, the light source panel 10 is installed at a position that is closer to the front windshield 20 than to the meter panel 23 (in other words, the far side of the instrument panel 22 from the eye point 30). Here, as shown in FIG. 6, the eye point 30 is set at a height of 635 (mm) vertically above a seating reference point 36 that is the hip joint point of a human phantom when the human phantom is seated on a seat in compliant with ISO6549-1980 (see "Notice that regulates the particulars of safety standard for road trucking vehicles [2005.11.09], enclosure 81, (Technical Standard Order for Front and Left-Side Under Mirror) described in the homepage address "http://www.mlit.go.jp/jidosha/kijyun/saimokubetten/saibet_081_00.pdf").

Figure 7:
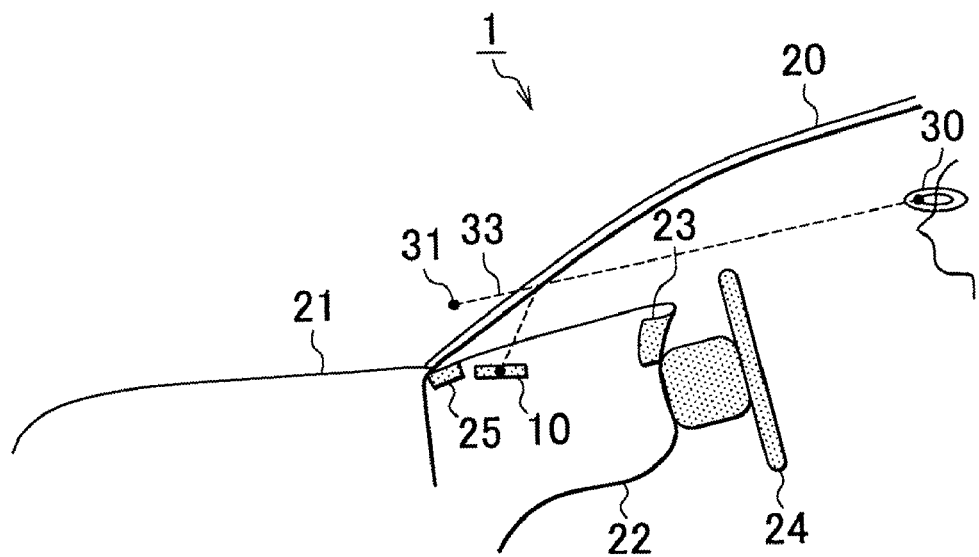
FIG. 7 is a view that shows an example of a position at which the light source panel is mounted.
Figure 8:
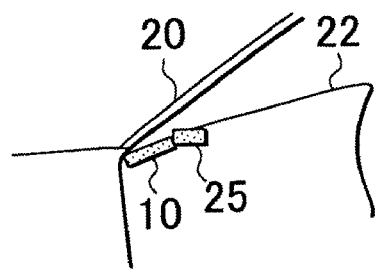
FIG. 8 is a view that shows an example of a position at which the light source panel is mounted.

FIG. 7 and FIG. 8 are views that show other examples of positions at which the light source panel 10 is mounted in the vehicle 1. In FIG. 7 and FIG. 8, the reference numeral 25 denotes a defroster outlet portion. For example, the light source panel 10 is installed at a portion on the near side (see FIG. 7) or far side (see FIG. 8) of the defroster outlet portion 25 when viewed from the eye point 30. For example, the light source panel 10 is installed under the surface of the instrument panel 22 (in other words, inside the instrument panel 22). For example, the light source panel 10 is embedded in the instrument panel 22.

Figure 9:
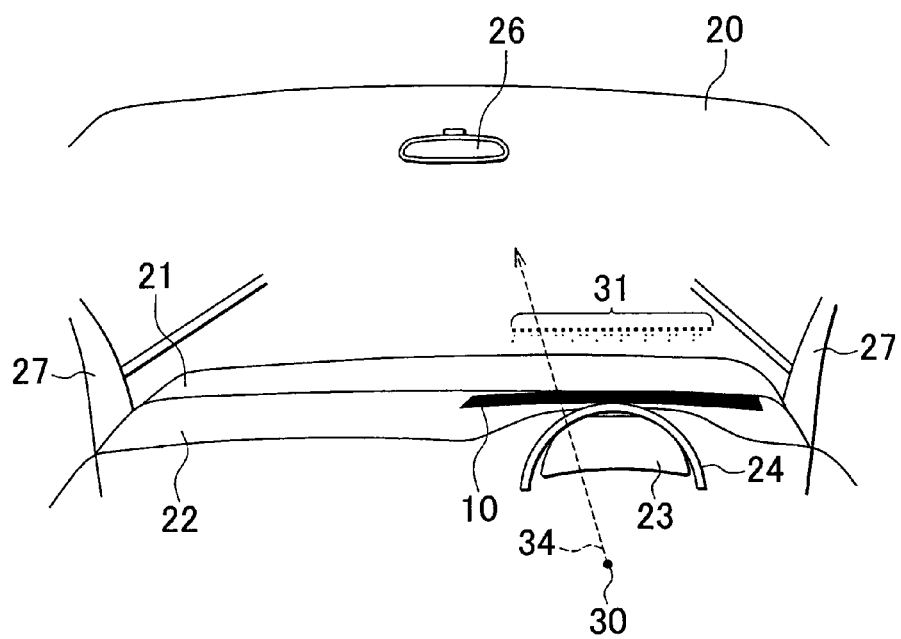
FIG. 9 is a view that shows an example of a position at which the light source panel is mounted.

FIG. 9 is a view that shows an example of a position at which the light source panel 10 is mounted in the vehicle 1. In FIG. 9, the reference numeral 26 denotes a rearview mirror, the reference numeral 27 denotes A pillars, and the reference numeral 34 denotes the driver's direction of gaze. For example, the light source panel 10 is installed at a position that is substantially ahead of the driver on the instrument panel 22. The light source panel 10 is installed on the instrument panel 22 so that the background of the virtual image 31 is, for example, a forward view (such as a road or a preceding vehicle) when viewed from the eye point 30.

Figure 10:
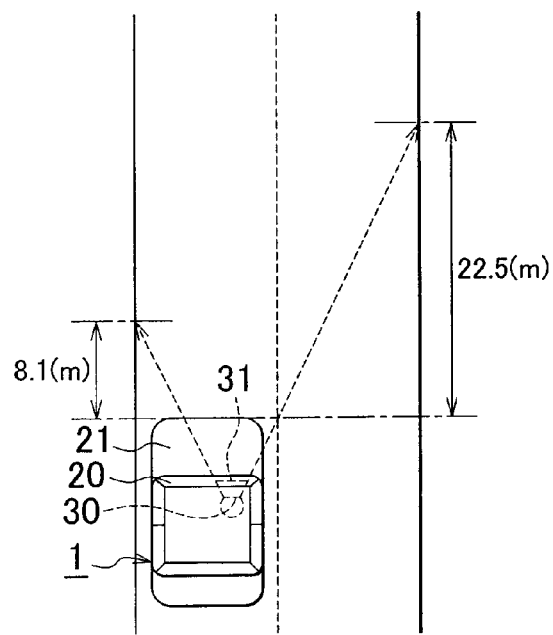
FIG. 10 is a view that shows an example of a range indicated by a virtual image when viewed from above a vehicle.

FIG. 10 is a view that shows an example of the range indicated by the virtual image 31 when viewed from above the vehicle 1. When the vehicle 1 in which the light source panel 10 is mounted on the instrument panel 22 as described above is, for example, present on a road with a sidewalk width of 1 (m) and a lane width of 3.2 (m), the range indicated by the virtual image 31 (the range for a risk object) when viewed from the eye point 30 is the illustrated range between a point 8.1 (m) ahead of the vehicle 1 on the left side to a point 22.5 (m) ahead of the vehicle 1 on the right side.

Referring back to FIG. 1, the lighting control unit 15 sets a normal, reminding or warning lighting pattern (lighting details or lighting mode regarding the position onto which light is projected on the front windshield 20, the area in which light is projected on the front windshield 20, the color of light, the luminance of light, the interval (blinking) of light, the amount of variation per unit variation in the color or luminance of light (the amount of unit variation in color or luminance), or the like) on the basis of the external environment around the vehicle 1, which is detected by the object sensor 11, the driver's point of gaze or direction of gaze detected by the driver sensor 12, the speed of the vehicle 1, which is detected by the vehicle speed sensor 13, the degree of risk around the vehicle 1, which is computed by the risk computing unit 14a, and the like, and the lighting control unit 15 executes lighting control (for example, adjusting an applied voltage, or the like) over the individual light sources 10a so as to attain the set lighting pattern.

Figures 11, 12:
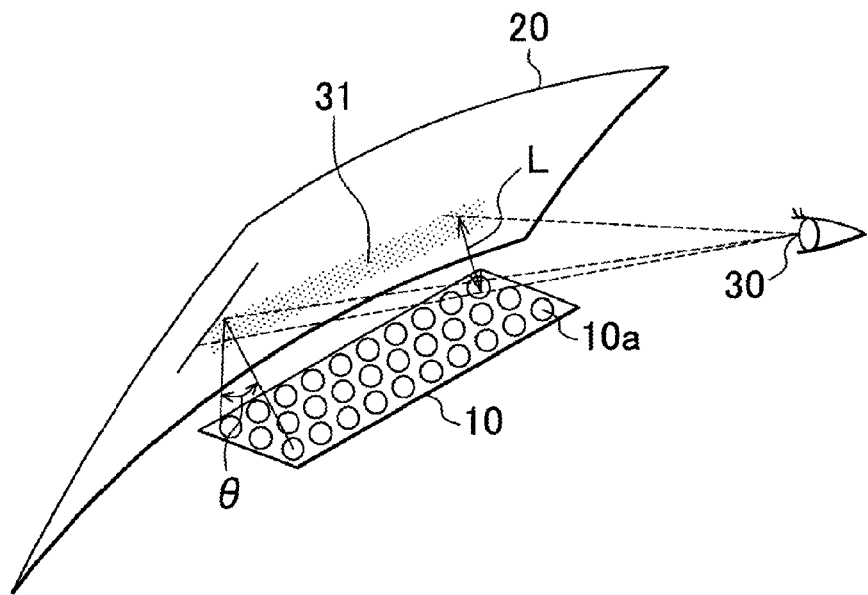
FIG. 11 is a view that shows an example of a method of adjusting the color and luminance of light from each of light sources.
FIG. 12 is a view that shows an example of a map that defines the correlation between a distance and a color/luminance and an example of a map that defines the correlation between an angle and a color/luminance.

Here, an example of an adjusting (calibration) method for the color and luminance of light from the light sources 10a will be described with reference to FIG. 11 to FIG. 13. As shown in FIG. 11, the color and luminance of light from the individual light sources 10a are adjusted in advance on the basis of a distance L and/or an angle θ. For example, the color and luminance of light from the individual light sources 10a are adjusted on the basis of a map (see FIG. 12) that defines the correlation between a distance L and a color/luminance and/or a map (see FIG. 12) that defines the correlation between an angle θ and a color/luminance. Here, the distance L is a distance from the light source 10a to the corresponding position onto which light from the light source 10a is projected on the front windshield 20. As shown in FIG. 12, the lighting control unit 15 increases the luminance of light from the light source 10a as the distance L increases. The angle θ is an angle formed by the front windshield 20 and the line segment that connects the position at which the light source 10a is arranged and the corresponding position onto which light is projected. As shown in FIG. 12, the lighting control unit 15 decreases the luminance of light from the light source 10a as the angle θ increases. The front windshield 20 may be regarded as "a portion of the vehicle body, onto which light is projected" according to the invention. In addition, the color and luminance of each of the light sources 10a during normal times, during reminding and during warning are, for example, adjusted in advance on the basis of the color of the instrument panel, A pillar, sideview mirror, or the like. For example, the color and luminance of each of the light sources 10a during normal times, during reminding and during warning are adjusted on the basis of a map (see FIG. 13) that defines the correlation between a body color and a normal color, reminding color, warning color and luminance. These adjusted statuses of the color and luminance are stored in the storage area of the lighting control unit 15.

Note that the lighting control unit 15 may adjust the luminance or color of light based on whether a head light is on or off, or using a photo detecting sensor or the like. For example, the lighting control unit 15 may decrease the luminance of light during nighttime hours. In addition, the lighting control unit 15 may adjust the luminance, color, interval (blinking), and the like, of light on the basis of the reliability of the degree of risk estimated by the risk computing unit 14a. In addition, the lighting control unit 15 may stop rays of light recognized by the driver among the lighted rays of light or reduce the luminance, color, or the like, of the recognized rays of light on the basis of the driver's point of gaze or direction of gaze detected by the driver sensor 12. In addition, the lighting control unit 15 may also notify the details of a risk object (for example, the risk object is a pedestrian, a vehicle, or the like) together with the position at which the risk object is present or the direction in which the risk object is present.

Referring back to FIG. 1, the light transmission control unit 16 adjusts the degree of transmission (the degree of blur/the degree of diffusion) of light from the light sources 10a of the light source panel 10 on the basis of the external environment around the vehicle 1, which is detected by the object sensor 11, the driver's point of gaze or direction of gaze detected by the driver sensor 12, the speed of the vehicle 1, which is detected by the vehicle speed sensor 13, the degree of risk around the vehicle 1, which is computed by the risk computing unit 14, the light pattern set by the lighting control unit 15, and the like.

For example, when the lighting control unit 15 lights the light sources 10a in the reminding lighting pattern, the light transmission control unit 16 increases the distance between the light sources 10a and the diffuser panel 10b in the light source panel 10 as a whole when the light source panel 10 shown in FIG. 2 is used, increases the distance between the diffuser panel 10b and the light guide members 10e in the light source panel 10 as a whole when the light source panel 10 shown in FIG. 3 is used or decreases the aperture ratio of the liquid crystal panel 10f in the light source panel 10 as a whole when the light source panel 10 shown in FIG. 4 is used. By so doing, the state of the virtual image 31 may be changed from the clear state shown in FIG. 14 to the blurry state shown in FIG. 15. That is, the virtual image 31 may be blurred.

In addition, on the basis of the degree of risk computed by the risk computing unit 14a, the light transmission control unit 16 adjusts the distance between the light sources 10a and the diffuser panel 10b when the light source panel 10 shown in FIG. 2 is used, adjusts the distance between the diffuser panel 10b and the light guide members 10e when the light source panel 10 shown in FIG. 3 is used or adjusts the aperture ratio of the liquid crystal panel 10f when the light source panel 10 shown in FIG. 4 is used. When the degree of risk is low, the light transmission control unit 16 increases the distance between the light sources 10a and the diffuser panel 10b as a whole, increases the distance between the diffuser panel 10b and the light guide members 10e as a whole or decreases the aperture ratio of the liquid crystal panel 10f as a whole. In addition, when the degree of risk is high, the light transmission control unit 16 reduces the distance between the light sources 10a and the diffuser panel 10b as a whole, reduces the distance between the diffuser panel 10b and the light guide members 10e as a whole or increases the aperture ratio of the liquid crystal panel 10f as a whole. By so doing, the clear virtual image 31 may be delivered when the risk is high; whereas the blurry virtual image 31 may be delivered when the risk is low.

In addition, when the lighting control unit 15 lights the light sources 10a in a lighting pattern that displays specific information (such as a character and an icon), the light transmission control unit 16 reduces the distance between the light sources 10a and the diffuser panel 10b in the light source panel 10 as a whole when the light source panel 10 shown in FIG. 2 is used, reduces the distance between the diffuser panel 10b and the light guide members 10e in the light source panel 10 as a whole when the light source panel 10 shown in FIG. 3 is used or increases the aperture ratio of the liquid crystal panel 10f in the light source panel 10 as a whole when the light source panel 10 shown in FIG. 4 is used. By so doing, the clear virtual image 31 corresponding to the specific information may be delivered.

Figure 17:
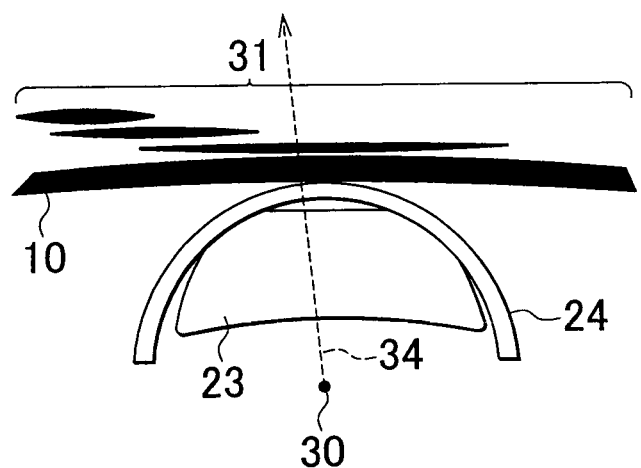
FIG. 17 is a view that shows an example of the way of showing a virtual image.

In addition, on the basis of the speed of the vehicle 1 detected by the vehicle speed sensor 13, the light transmission control unit 16 adjusts the distance between the light sources 10a and the diffuser panel 10b when the light source panel 10 shown in FIG. 2 is used, adjusts the distance between the diffuser panel 10b and the light guide members 10e when the light source panel 10 shown in FIG. 3 is used or adjusts the aperture ratio of the liquid crystal panel 10f when the light source panel 10 shown in FIG. 4 is used. When the vehicle speed is lower than or equal to a predetermined value (for example, when the vehicle 1 is stopped, or the like), the light transmission control unit 16 reduces the distance between the light sources 10a and the diffuser panel 10b as a whole, reduces the distance between the diffuser panel 10b and the light guide members 10e as a whole or increases the aperture ratio of the liquid crystal panel 10f as a whole. On the other hand, when the vehicle speed exceeds the predetermined value (for example, when the vehicle 1 is running, or the like), the light transmission control unit 16 increases the distance between the light sources 10a and the diffuser panel 10b as a whole, increases the distance between the diffuser panel 10b and the light guide members 10e as a whole or decreases the aperture ratio of the liquid crystal panel 10f as a whole. By so doing, the clear virtual image 31 shown in FIG. 16 may be delivered when the vehicle 1 is stopped; whereas the blurry virtual image 31 shown in FIG. 17 may be delivered when the vehicle 1 is running.

Figure 18:
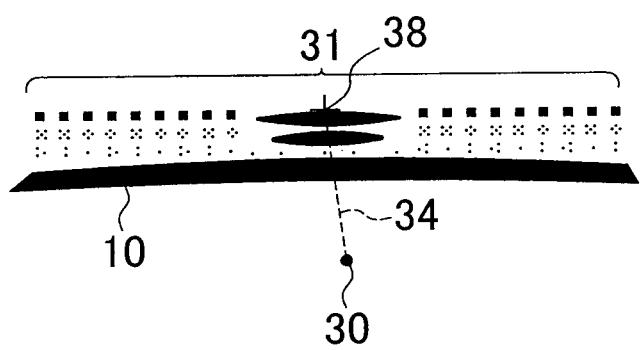
FIG. 18 is a view that shows an example of the way of showing a virtual image.

In addition, when the light source panel 10 shown in FIG. 2 is used, the light transmission control unit 16 partially increases the distance between the light sources 10a that project light to around a driver's point of gaze 38 detected by the driver sensor 12 and only part of the diffuser panel 10b, which corresponds to the positions at which those light sources 10a are arranged. When the light source panel 10 shown in FIG. 3 is used, the light transmission control unit 16 partially increases the distance between the diffuser panel 10b and only part of the light guide members 10e, which are arranged in correspondence with the light sources 10a that project light to around the point of gaze 38 (see FIG. 18). When the light source panel 10 shown in FIG. 4 is used, the light transmission control unit 16 decreases the aperture ratio of only part of the liquid crystal panel 10f, which corresponds to the positions at which the light sources 10a that project light to around the point of gaze 38 are arranged. By so doing, as shown in FIG. 18, only part of the virtual image 31 viewed by the driver (part of the virtual image 31 around the point of gaze 38) may be selectively blurred and delivered in the blurry state.

Figure 19:
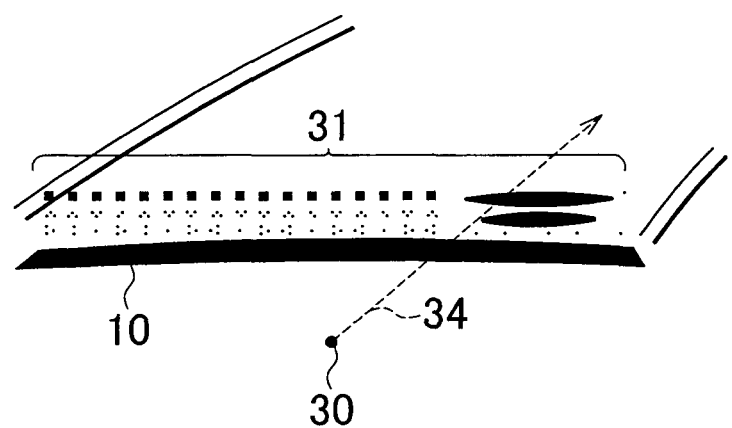
FIG. 19 is a view that shows an example of the way of showing a virtual image.

In addition, the light transmission control unit 16 adjusts the degree of transmission of light from the light sources 10a of the light source panel 10 on the basis of a road shape, such as a left-hand curve and a right-hand curve. When the light source panel 10 shown in FIG. 2 is used, the light transmission control unit 16 partially increases the distance between the light sources 10a that project light toward a direction (for example, right-hand direction for a right-hand curve, a left-hand direction for a left-hand curve) in which the road shape changes and in which the driver gazes and only part of the diffuser panel 10b, which corresponds to the positions at which those light sources 10a are arranged. When the light source panel 10 shown in FIG. 3 is used, the light transmission control unit 16 partially increases the distance between the diffuser panel 10b and only part of the light guide members 10e, which are arranged in correspondence with the light sources 10a that project light toward a direction in which the road shape changes. When the light source panel 10 shown in FIG. 4 is used, the light transmission control unit 16 decreases the aperture ratio of only part of the liquid crystal panel 10f, which corresponds to the positions at which the light sources 10a that project light toward a direction in which the road shape changes are arranged. By so doing, as shown in FIG. 19, only part of the virtual image 31 in the curve direction in which the driver gazes (part of the virtual image 31 around the direction of gaze 34) may be selectively blurred and delivered in the blurry state.

Figure 20:
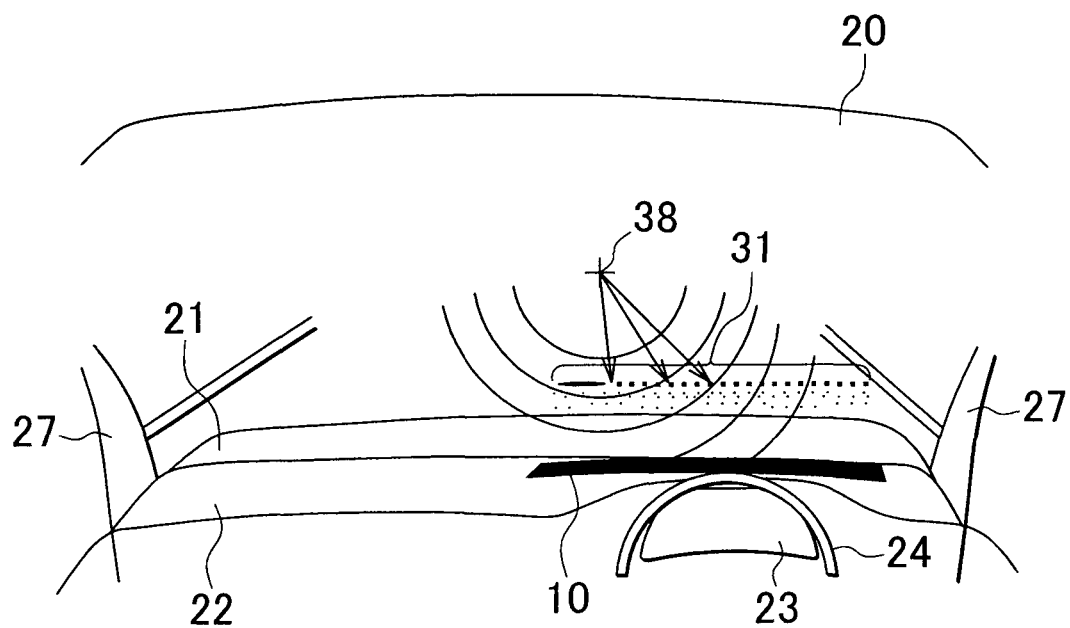
FIG. 20 is a view that shows an example of the way of showing a virtual image.

In addition, the light transmission control unit 16 adjusts the degree of transmission of light from the light sources 10a of the light source panel 10 on the basis of the distance from a driver's central visual field (the driver's point of gaze 38 detected by the driver sensor 12 (see FIG. 20)) to the virtual image 31. When the light source panel 10 shown in FIG. 2 is used, the light transmission control unit 16 relatively increases the distance between the diffuser panel 10b and the light sources 10a having a relatively short distance from the point of gaze 38, relatively reduces the distance between the diffuser panel 10b and the light sources 10a having a relatively long distance from the point of gaze 38, and sets the distance between the diffuser panel 10b and the light sources 10a having a relatively intermediate distance from the point of gaze 38 at a relatively intermediate distance. When the light source panel 10 shown in FIG. 3 is used, the light transmission control unit 16 relatively increases the distance between the diffuser panel 10b and the light guide members 10e that are arranged in correspondence with the light sources 10a having a relatively short distance from the point of gaze 38, relatively reduces the distance between the diffuser panel 10b and the light guide members 10e that are arranged in correspondence with the light sources 10a having a relatively long distance from the point of gaze 38 and sets the distance between the diffuser panel 10b and the light guide members 10e that are arranged in correspondence with the light sources 10a having a relatively intermediate distance from the point of gaze 38 at a relatively intermediate distance. When the light source panel 10 shown in FIG. 4 is used, the light transmission control unit 16 relatively decreases the aperture ratio of part of the liquid crystal panel 10f, which corresponds to the positions at which the light sources 10a having a relatively short distance from the point of gaze 38 are arranged, relatively increases the aperture ratio of part of the liquid crystal panel 10f, which corresponds to the positions at which the light sources 10a having a relatively long distance from the point of gaze 38 are arranged, and sets the aperture ratio of part of the liquid crystal panel 10f, which corresponds to the positions at which the light sources 10a having a relatively intermediate distance from the point of gaze 38 are arranged, at a relatively intermediate aperture ratio. By so doing, as shown in FIG. 20, the state of the virtual image 31 may be gradually changed from the blurry state to the clear state from the position having a short distance from the point of gaze 38 to the position having a long distance from the point of gaze 38.

2. Operation

Figures 21, 22:
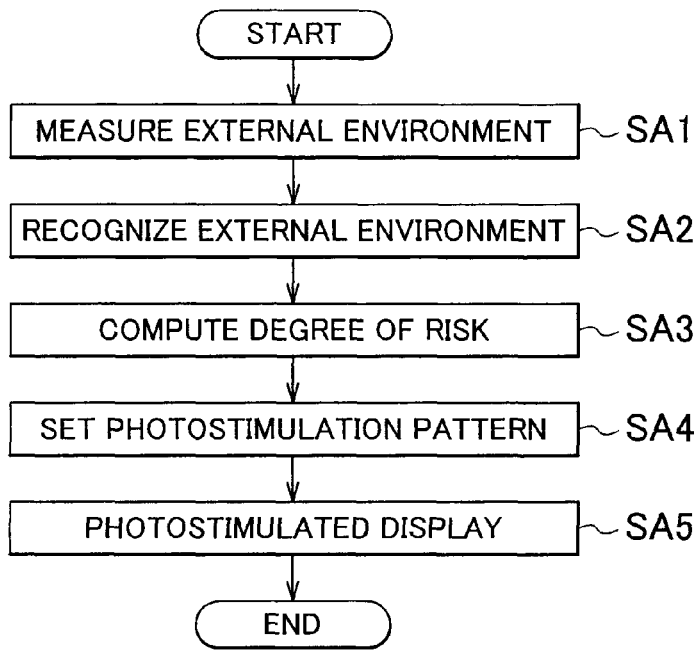
FIG. 21 is a flowchart that shows an example of risk computing operation and lighting control operation that are executed by the vehicle information transmission system according to the embodiment.
FIG. 22 is a view that shows an example of a map that defines the correlation between the position and degree of risk of an object and the projected position and projected area of light.

FIG. 21 is a flowchart that shows an example of risk computing operation and lighting control operation that are executed by the vehicle information transmission system according to the present embodiment.

Step SA1: Measurement of External Environment

The object sensor 11 measures information about an object (such as a pedestrian, a bicycle, an automobile and a blind spot) around the vehicle 1.

Step SA2: Recognition of External Environment

The risk computing unit 14a recognizes whether the condition around the vehicle 1 is a normal condition in which no object is present and reminding or warning is not required or a condition in which an object is present and reminding or warning is required on the basis of the information about the object, which is measured in step SA1. For example, the risk computing unit 14a recognizes that the condition around the vehicle 1 is a normal condition when no object is present and recognizes that the condition around the vehicle 1 is a condition in which reminding or warning is required when an object is present.

Step SA3: Computation of Degree of Risk

When it is recognized in step SA2 that the condition around the vehicle 1 is a condition in which reminding or warning is required, the risk computing unit 14a locates the position at which the object is present on the basis of the information about the object, which is measured in step SA1. The risk computing unit 14a estimates that an object of which the position cannot be located has a low degree of risk (i.e., estimates that the condition around the vehicle 1 is a condition in which reminding is required).

For an object of which the position can be located, the risk computing unit 14a calculates the distance between the object and the vehicle 1 and the relative deceleration (which may be relative speed or relative acceleration) of the object with respect to the vehicle 1. The risk computing unit 14a estimates that the degree of risk is high (i.e., estimates that the condition around the vehicle 1 is a condition in which warning is required) when the distance is short, and estimates that the degree of risk is low (i.e., estimates that the condition around the vehicle 1 is a condition in which reminding is required) when the distance is long. In addition, the risk computing unit 14a estimates that the degree of risk is low (i.e., estimates that the condition around the vehicle 1 is a condition in which reminding is required) when the relative deceleration of the object with respect to the vehicle 1 is low and estimates that the degree of risk is high (i.e., estimates that the condition around the vehicle 1 is a condition in which warning is required) when the relative deceleration is high.

Step SA4: Setting of Photostimulation Pattern

On the basis of the position at which the object is present, located in step SA3, and the degree of risk of the object, estimated in step SA3, the lighting control unit 15 consults a map shown in FIG. 22, which defines the correlation between the position and degree of risk of an object and the projected position and projected area of light, to determine the projected position (projected position in the horizontal direction and projected position in the vertical (height) direction) and projected area of light for notification and, where necessary, determines the projected position and projected area of light for attention allocation. For example, the projected position of light for notification (i.e., the position onto which light for notification is projected) is set at the left side when the position at which the object is present is the left side, set at the front side when the position is the front side and set at the right side when the position is the right side. On the other hand, the projected position of light for attention allocation is set at the right side when the projected position of light for notification is the left side, set at the left side when the projected position of light for notification is the right side and is not set when the projected position of light for notification is the front side or both the right and left sides. In addition, the projected area of light for notification is increased during warning when the degree of risk of the object is high and is reduced during reminding when the degree of risk of the object is low. On the other hand, the projected area of light for attention allocation is reduced so that the difference from the projected area of light for notification is distinct during warning when the degree of risk of the object is high and is slightly reduced so that the difference from the projected area of light for notification is not so distinct during reminding when the degree of risk of the object is low.

Figures 13, 14:
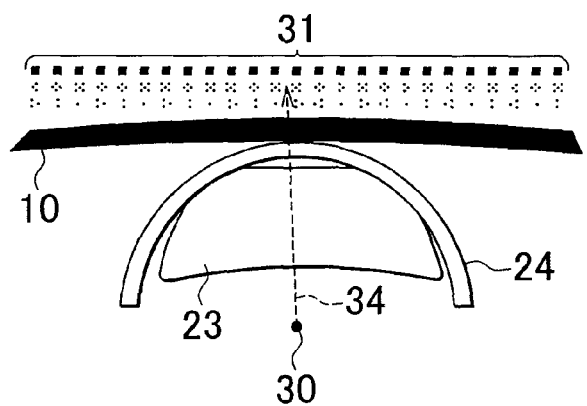
FIG. 13 is a view that shows an example of a map that defines the correlation between a body color and a normal color, reminding color, warning color and luminance.
FIG. 14 is a view that shows an example of the way of showing a virtual image.
Figure 23:
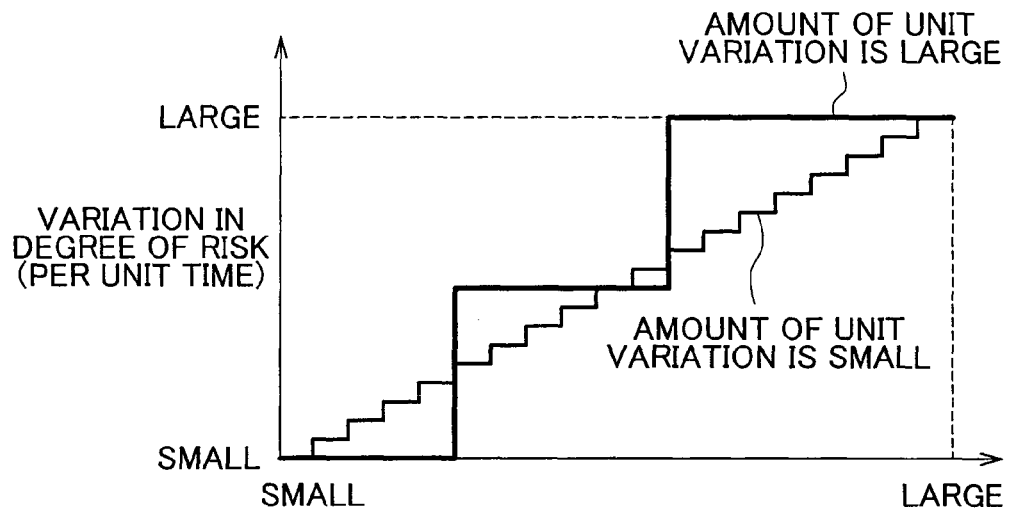
FIG. 23 is a graph that shows an example of the correlation between the degree of risk and the rate of variation per unit variation in the color or luminance of light.

On the basis of the degree of risk of the object, estimated in step SA3, and the statuses of color and luminance adjusted in accordance with the maps shown in FIG. 12 and FIG. 13 and stored in advance, the lighting control unit 15 determines the color and luminance of light for notification and, where necessary, determines the color and luminance of light for attention allocation, which are different from the color and luminance of light for notification. In addition, the lighting control unit 15 determines the amounts of variation per unit variation (the amounts of unit variation) in the color and luminance of light for notification on the basis of the degree of risk of the object, estimated in step SA3. For example, as shown in FIG. 23, the amounts of unit variation in color and luminance are increased when a variation per unit time in the degree of risk is large, and the amounts of unit variation in color and luminance are reduced when a variation per unit time in the degree of risk is small.

The lighting control unit 15 sets a lighting pattern for notification (reminding or warning), which includes the determined projected position, projected area, color, luminance and amounts of unit variation of light. When it is recognized in step SA2 that the condition around the vehicle 1 is a normal condition in which reminding is not required, the lighting control unit 15 sets a normal lighting pattern, which includes the color and luminance for normal times and is different from the lighting pattern for notification, on the basis of the statuses of color and luminance adjusted in accordance with the maps shown in FIG. 12 and FIG. 13 and stored in advance.

Step SA5: Photostimulated Display

The lighting control unit 15 sets (corrects) the center position of the lighted light source panel 10 on the basis of a road shape, and on the basis of the lighting pattern for notification or normal times, set in step SA4, and the set center position, the lighting control unit 15 executes lighting control over each of the light sources 10a so as to attain the lighting pattern.

Figure 24:
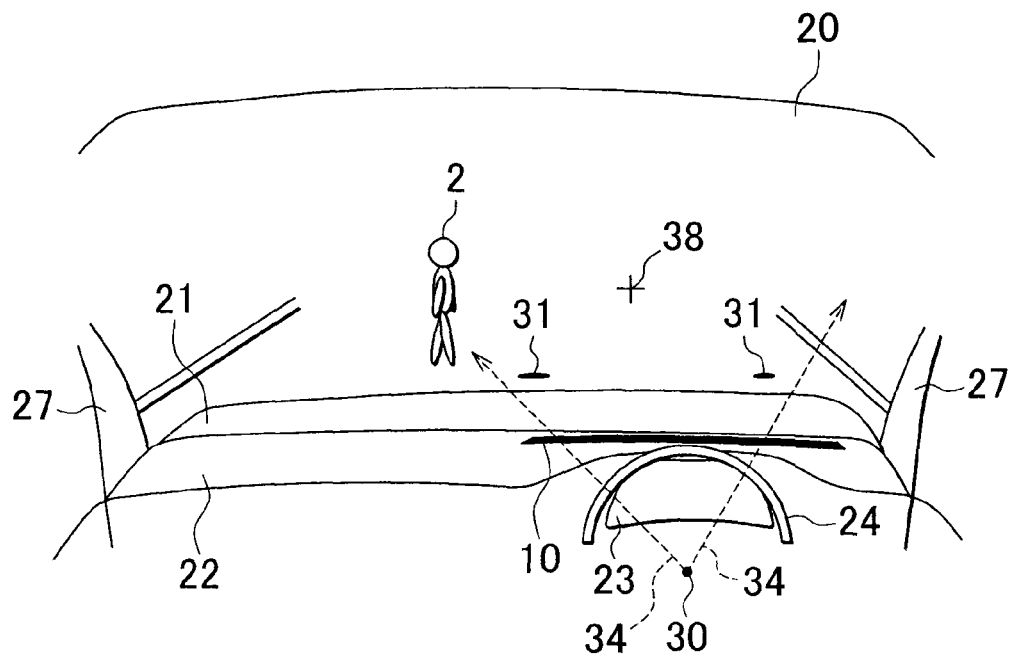
FIG. 24 is a view that shows an example of the way of showing a virtual image.

Thus, with the above described risk computing operation and lighting control operation, in the situation shown in FIG. 24 in which warning is required (for example, in a situation in which an object 2 having a high degree of risk is present at the left side when viewed from the driver), the virtual image 31 for notification set on the basis of the degree of risk of the object 2 is delivered at the left side, and the virtual image 31 of a dummy for attention allocation, which is set so that the total of allocations of driver's attention to around the vehicle 1 is constant, is also delivered at the right side so that the total of the attention allocations is constant, so, in the above situation, the uniform distribution of driver's attention to around the vehicle 1 may be maintained (i.e., driver's attention may be uniformly distributed).

Figure 25:
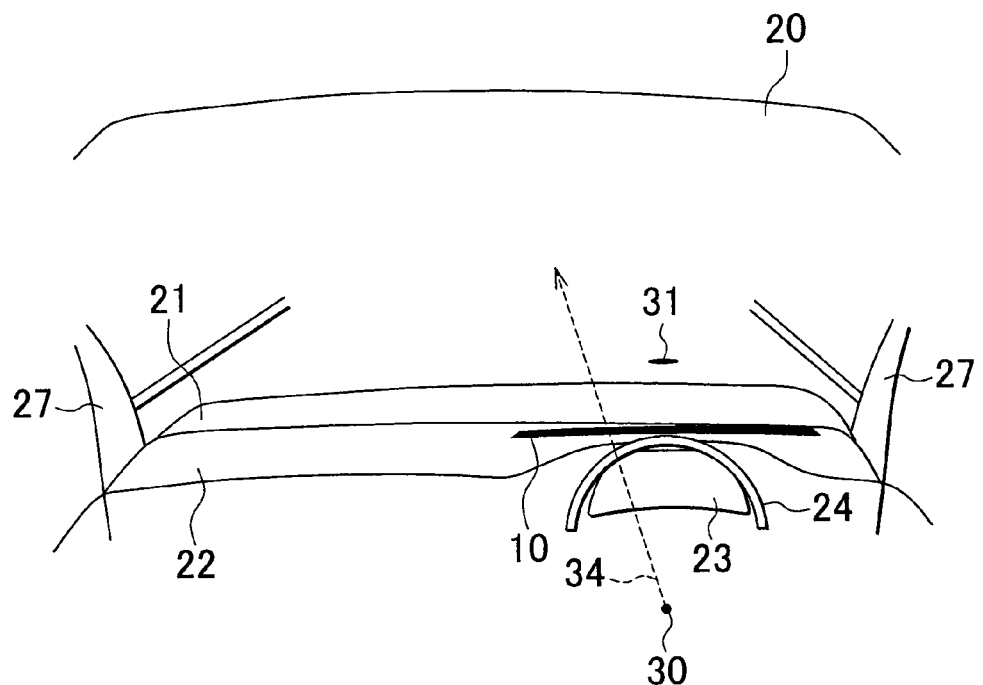
FIG. 25 is a view that shows an example of the way of showing a virtual image.
Figure 26:
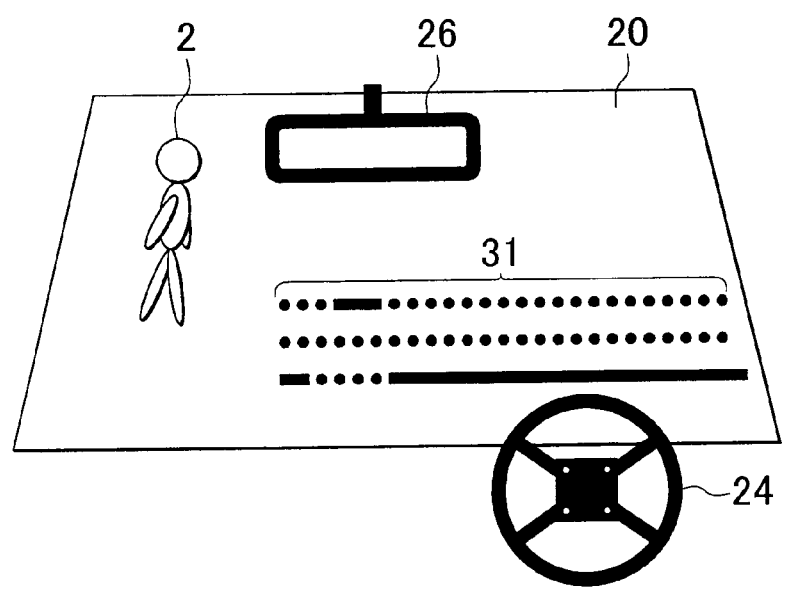
FIG. 26 is a view that shows an example of the way of showing a virtual image.

In addition, with the above described risk computing operation and lighting control operation, in a normal (safe) situation (for example, a situation in which no object is present around the vehicle 1) shown in FIG. 25 in which reminding or warning is not required, the virtual image 31 for normal times, which has a low and soft color tone and is different from the virtual image 31 for notification, is delivered at, for example, the left side, the center (front side), the right side or all of them when viewed from the driver. In addition, when a normal situation changes into a situation shown in FIG. 26 in which the object 2 appears and warning is required, the light level of part of the green virtual image 31 for normal times in the lowermost region, which corresponds to the position at which the object 2 is present or the direction in which the object 2 is present (part of the lowermost region at the left side in FIG. 26) is decreased, while the light level of the corresponding part of the red virtual image 31 for warning in the uppermost region (part of the upper most region at the left side in FIG. 26) is increased. The virtual image 31 may be regarded as a series of light dots extending in the vehicle-width direction. The green virtual image 31 and the red virtual image 31 are parallel to each other. The virtual images 31 may be displayed at a plurality of different positions, such as the A pillar, the sideview mirror, the meter panel, and the instrument panel. By so doing, when a normal situation changes into a situation in which reminding or warning is required, it is possible to more naturally remind or warn the driver without causing a feeling of strangeness and unexpectedness.

Figure 27:
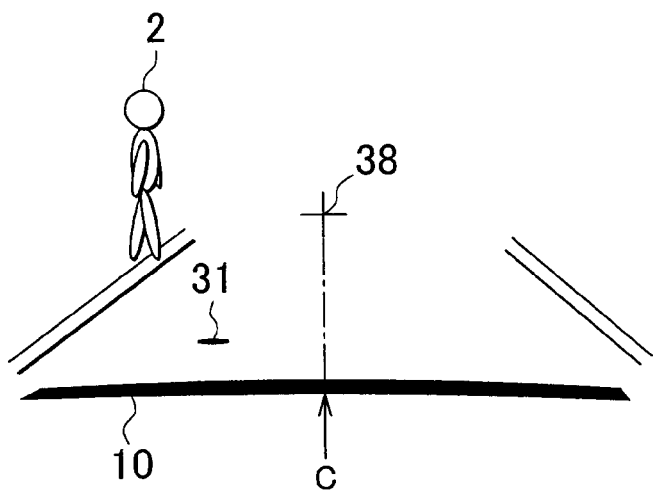
FIG. 27 is a view that shows an example of the way of showing a virtual image.
Figure 28:
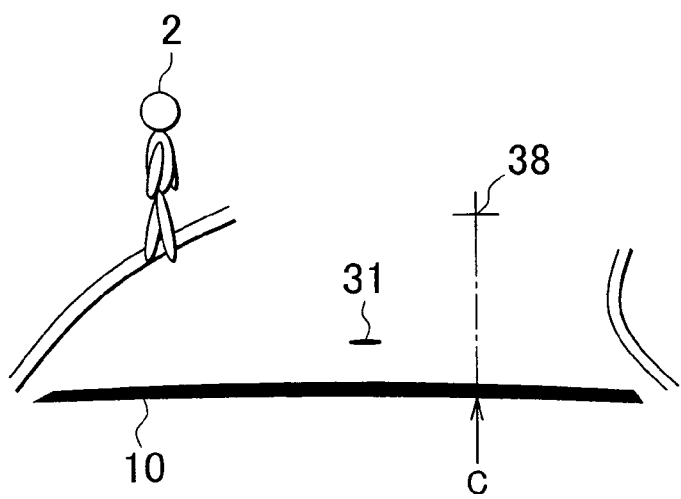
FIG. 28 is a view that shows an example of the way of showing a virtual image.

In addition, with the above described risk computing operation and lighting control operation, when the vehicle is running on a straight road in a situation in which notification is required as shown in FIG. 27, the center position C during lighting is set at (corrected to) the center (front side) when viewed from the driver in accordance with the road shape, and, when the vehicle 1 is running on a right-hand curve road as shown in FIG. 28, the center position C during lighting is set at (corrected to) the right side when viewed from the driver in accordance with the road shape, and then the virtual image 31 for notification is delivered on the basis of the set center position C. By so doing, it is possible to remind or warn the driver within the range that does not fall outside the driver's visual field (a certain range from the driver's direction of gaze).

Figure 29:
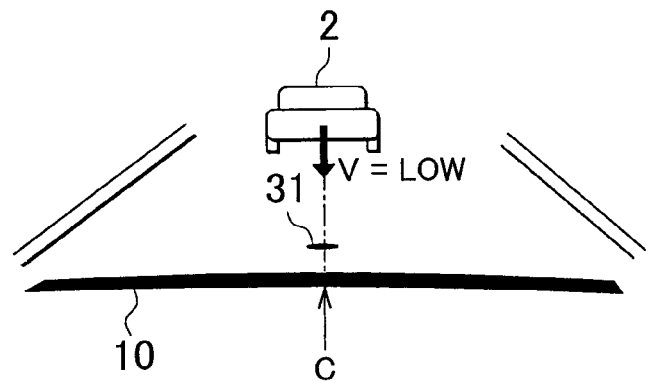
FIG. 29 is a view that shows an example of the way of showing a virtual image.
Figure 30:
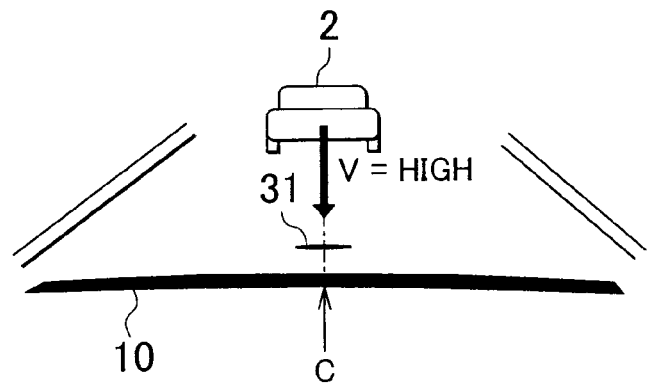
FIG. 30 is a view that shows an example of the way of showing a virtual image.

In addition, with the above described risk computing operation and lighting control operation, in a situation in which the relative deceleration V of an object 2 that is a preceding vehicle is low and reminding is required as shown in FIG. 29, the virtual image 31 for reminding, in which the amounts of unit variation are reduced, is delivered, and, in a situation in which the relative deceleration V of the object 2 is high and warning is required as shown in FIG. 30, the virtual image 31 for warning, in which the amounts of unit variation are increased, is delivered, so it is possible to remind or warn the driver using the details of lighting, which suit the relative relationship between the vehicle 1 and an object.

3. Summary of Present Embodiment

According to the present embodiment, light from the plurality of light sources 10*a* arranged in an array (a plurality of rows or a plurality of columns) in the light source panel 10 mounted at a predetermined position of the instrument panel 22 is projected onto a portion of the front windshield 20, which corresponds to the position at which a risk object (such as a pedestrian, a bicycle, an automobile and a blind spot) is present or the direction in which the risk object is present, using a color, luminance, area, interval, or the like corresponding to the degree of risk or the like of the risk object, to remind or warn the driver. For example, in a conventional night view system, when a pedestrian is detected by an infrared ray sensor during nighttime hours, the detected pedestrian is surrounded by a frame to be informed on a screen; however, it is difficult for a driver to recognize the correspondence between details displayed on the screen and an actual situation. However, according to the present embodiment, it is possible to reliably notify the driver of the position or direction of a risk object more easily and also to notify the driver without causing any inconvenience and a feeling of strangeness.

In addition, according to the present embodiment, the luminance (applied voltage) and color of light from each light source 10*a* are set on the basis of the distance from the position at which the light source 10*a* is arranged to the projected position of light from the light source 10*a* on the front windshield 20 and/or the angle formed by the front windshield 20 and the line segment that connects the arranged position of each light source 10*a* and the projected position of light from that light source 10*a*. For example, the luminance of light is increased as the distance between the light source 10*a* and the corresponding projected position increases. By so doing, light reflected from the vehicle body is more easily visually recognized by the driver and, as a result, it is possible to improve information transmission efficiency. In addition, light may be adjusted to an easily recognizable position in accordance with the driver's eye point.

In addition, according to the present embodiment, the light source panel 10 includes the mechanism for adjusting the luminance of light (the degree of transmission of light or the degree of blur of light) from each of the light sources 10*a*. Thus, it is possible to eliminate inconvenience due to intense light. For example, when the driver is prompted to locate a position or direction, the luminance of light is decreased to blur the virtual image; whereas, when specific information, such as a character and an icon, is transmitted, the luminance of light is increased to clearly deliver the virtual image. By so doing, it becomes hard for the driver to focus on the virtual image, and the driver is able to easily see a forward view. In addition, in the case where specific information is transmitted, the luminance of light is decreased to blur the virtual image when the vehicle 1 is running at a speed that exceeds a predetermined speed. By so doing, during stop of the vehicle, visual recognition through central vision is guided to make it possible to provide detailed information; whereas, during vehicle running, visual recognition through peripheral vision is guided to make it possible to transmit only the presence and position of a risk. That is, the amount and quality of transmitted information may be improved during stop of the vehicle; whereas the amount and quality of transmitted information may be limited during vehicle running. In addition, only the light sources 10*a* that correspond to the projected position of light recognized by the driver are selectively decreased in the luminance of light to partially blur the virtual image. By so doing, it becomes hard for the driver to focus on the virtual image that the driver has viewed once, so the time during which an eye point is retained through direct vision may be reduced. In addition, as the quality and priority of transmitted information become higher, for example, as the degree of risk around the vehicle 1 increases, the luminance of light is increased to clearly deliver the virtual image. By so doing, important information may be reliably transmitted to the driver. In addition, the direction of the line of sight, on which the driver should place the most importance, is estimated from a road shape (curve), and the luminance of light projected in this direction is decreased to blur the virtual image. By so doing, during cornering, it becomes difficult for the driver to focus on the virtual image in the direction of gaze, so a forward view is more easily seen. In addition, the luminance of light is adjusted on the basis of a distance from the central vision, to change the degree of blur of the virtual image. By so doing, in consideration of human characteristics that a clearer shape may be captured as it approaches the central vision, the amount and quality of transmitted information may be made more appropriate.

In addition, according to the present embodiment, when the position at which an object is present or the direction in which the object is present is notified, a virtual image for notification, which corresponds to the degree or the like of risk of the object, is delivered at a portion of the front windshield 20 corresponding to the position at which the object is present or the direction in which the object is present, and a virtual image for attention allocation, which is different from the virtual image for notification, is delivered at a portion of the front windshield 20 corresponding to a position or direction different from the above position or direction at or in which the object is present. For example, when a risk object is present at the left side or the right side, the distribution of the details of lighting is adjusted (changed) on the basis of the degree of risk. By so doing, the driver is exactly prompted to locate an object, while driver's attention to around the vehicle 1 may be uniformly distributed, that is, the uniform distribution of driver's attention to around the vehicle 1 may be maintained to the same extent as that during normal times. In addition, when a plurality of virtual images are delivered at the same time, light levels of the virtual images may vary in accordance with the details of risks. In addition, the driver is prompted to recognize discontinuous separated positions not integrally but separately. By so doing, attention may be appropriately allocated to the portions that should be recognized while prompting recognition of a wide range. Note that, when information having high urgency is notified, a virtual image for notification, which corresponds to that information, may be delivered earlier than a virtual image for attention allocation.

In addition, according to the present embodiment, even in a normal condition, the light sources 10*a* for the left side, the center or the right side in front of the vehicle are constantly lighted using the details of lighting for normal times. By so doing, when a normal condition changes into a notification condition, the driver may be reminded or warned without excessively highlighted light and a feeling of strangeness.

In addition, according to the present embodiment, the roughness of a stepwise variation in the color and luminance of light is changed on the basis of a variation in the degree of risk around the vehicle 1. For example, when a variation in the degree of risk around the vehicle 1 is large, light is projected so that the amounts of variation in luminance and/or color per unit variation increase, that is, the luminance and/or the color roughly change; whereas, when a variation in the degree of risk around the vehicle 1 is small, light is projected so that the amounts of variation in luminance and/or color per unit variation reduce, that is, the luminance and/or the color minutely change. That is, the amounts of variation in the luminance and/or color of light are changed on the basis of the correlation between the luminance and/or color of light and a risk. By so doing, a variation in the degree of risk may be clearly transmitted to the driver by changing the way of feeling a risk. In addition, the roughness of stepwise variation in the color or luminance of light is changed on the basis of the priority of transmitted information. For example, when information having a high priority is transmitted, light is projected so that the amounts of variation in luminance and/or color per unit variation increase, that is, the luminance and/or the color roughly change; whereas, when information having a low priority is transmitted, the amounts of variation in luminance and/or color per unit variation reduce, that is, the luminance and/or the color minutely change. By so doing, the importance of information may be clearly transmitted to the driver.

As described above, the vehicle information transmission device according to the aspect of the invention is useful in automobile manufacturing industry and is particularly suitable for transmission of information to the driver using the vehicle body.

The invention claimed is:

1. A vehicle information transmission device comprising:
a display device that (i) displays a first virtual image of light which has a predetermined color tone at a position on a vehicle body, at which visual recognition of a certain object is prompted, when the visual recognition is prompted, and that (ii) displays a second virtual image of light which has a different color tone from the first virtual image of light at a position on the vehicle body which is different from the position at which the first virtual image of light is displayed when the visual recognition is not prompted and when the visual recognition is prompted; and
a control unit that adjusts the position at which the second virtual image of light is displayed based on the position at which the first virtual image of light is displayed when the visual recognition is prompted, wherein
when the visual recognition is prompted, the control unit decreases a light level of only a portion, which corresponds to the position at which the visual recognition is prompted, of the second virtual image of light displayed on the vehicle body.

2. The vehicle information transmission device according to claim 1, wherein
the display device displays light at a plurality of different positions on the vehicle body when the visual recognition is prompted and when the visual recognition is not prompted.

3. The vehicle information transmission device according to claim 1, wherein
the display device displays red series light and green series light on the vehicle body when the visual recognition is prompted, and displays the green series light on the vehicle body when the visual recognition is not prompted.

4. The vehicle information transmission device according to claim 1, wherein
the display device displays light on the vehicle body in a manner such that a series of light dots extends in a vehicle-width direction.

5. The vehicle information transmission device according to claim 4, wherein
the control unit corrects a center position of light on a basis of a curved shape of a road when light is displayed on the vehicle body.

6. The vehicle information transmission device according to claim 1, wherein
the display device displays light on the vehicle body in a manner such that a series of light dots extends in a vehicle-width direction,
the display device displays first color light on the vehicle body when the visual recognition is not prompted, and displays second color light together with the first color light on the vehicle body when the visual recognition is prompted, and
the control unit adjusts only a portion, which corresponds to the position at which the visual recognition is prompted, of the first color light when the visual recognition is prompted.

7. The vehicle information transmission device according to claim 6, wherein
the first color light and the second color light are parallel to each other.

8. The vehicle information transmission device according to claim 6, wherein
the first color is a green series color, and the second color is a red series color.

9. The vehicle information transmission device according to claim 6, wherein
on the vehicle body, the second color light is displayed above the first color light.

10. The vehicle information transmission device according to claim 1, wherein
the display device is installed inside a vehicle, and
the display device projects light onto a front windshield.

11. The vehicle information transmission device according to claim 10, wherein
the display device is installed at an instrument panel.

* * * * *